July 21, 1959     E. L. STANDISH     2,895,751
HYDROGEN SEAL FOR DYNAMOELECTRIC MACHINES
Filed July 5, 1957

Inventor
Earl L. Standish
by H. Edward Foech, Jr.
Attorney

United States Patent Office 2,895,751
Patented July 21, 1959

2,895,751

HYDROGEN SEAL FOR DYNAMOELECTRIC MACHINES

Earl L. Standish, West Allis, Wis., assignor to Allis-Chalmers Manufacturing Company, Milwaukee, Wis.

Application July 5, 1957, Serial No. 670,163

5 Claims. (Cl. 286—19)

This invention relates to a hydrogen seal for use in dynamoelectric machines. More particularly, this invention relates to a thrust type hydrogen seal for dynamoelectric machines in which an oil discharge groove having a controlled pressure is provided in the surface of the seal member radially inward of the oil supply groove.

In a usual thrust type hydrogen seal for dynamoelectric machines, an axially movable seal member presents an annular surface which runs against an annular surface of a flange on the rotor shaft. Where oil or other fluid is used to lubricate and cool the surfaces of these seals, the amount of oil flowing across the surfaces into the machine must be limited because air carried by this oil contaminates the hydrogen and because hydrogen becomes entrained in the oil and is liberated elsewhere in the lubricating system. On the other hand, sufficient oil must be supplied to the surfaces to lubricate and cool the bearing surfaces, and the oil must be under a pressure greater than the hydrogen pressure to prevent the hydrogen from blowing out between the two surfaces.

According to the present invention, a nonrotatable thrust bearing type seal member is provided with an annular surface which runs against an annular surface of a flange on the rotary member of the machine. An annular groove in the surface of the seal member is supplied with a lubricating oil under pressure. Oil in the supply groove is wiped or flows both inward and outward across the surfaces to lubricate and cool the surfaces. A second groove is provided in the surface of the seal member radially inward of the first or supply groove to collect oil flowing radially inward. Duct means are provided from this second groove to return the lubricating oil to the supply reservoir.

In order to maintain the pressure of the oil in the inner groove above the hydrogen pressure in the machine and thus prevent hydrogen from flowing through the duct means to the oil reservoir, means are provided for controlling the rate at which the oil flows from the inner groove. In this manner a back pressure is provided to maintain the oil pressure in the inner groove at a predetermined differential above the hydrogen pressure. For any hydrogen pressure a minimum differential pressure is maintained between the oil pressure in the inner groove and the hydrogen pressure in the machine, and only a limited amount of oil flows into the machine to contaminate the hydrogen.

It will now be seen that according to the present invention a hydrogen seal is provided for dynamoelectric machines in which the flow of oil to and across the bearing surfaces of the seal may be increased while at the same time the flow of oil into the machine may be held to a minimum at all hydrogen pressures.

It is therefore an object of the present invention to provide a hydrogen seal which permits greater oil flow across the bearing surfaces.

Another object of the present invention is to provide a hydrogen seal which maintains the amount of lubricating oil flowing into the hydrogen enclosure to a minimum for all hydrogen pressures.

Another object of the present invention is to provide an improved hydrogen seal having means to collect oil flowing radially inward across the seal surfaces.

Another object of the present invention is to provide a hydrogen seal which maintains a given minimum pressure differential between oil in a groove in the seal face and hydrogen pressure in the machine.

Other objects and advantages of the present invention will be apparent from a consideration of the following description taken in connection with the accompanying drawings, in which.

Figures 1, 4:
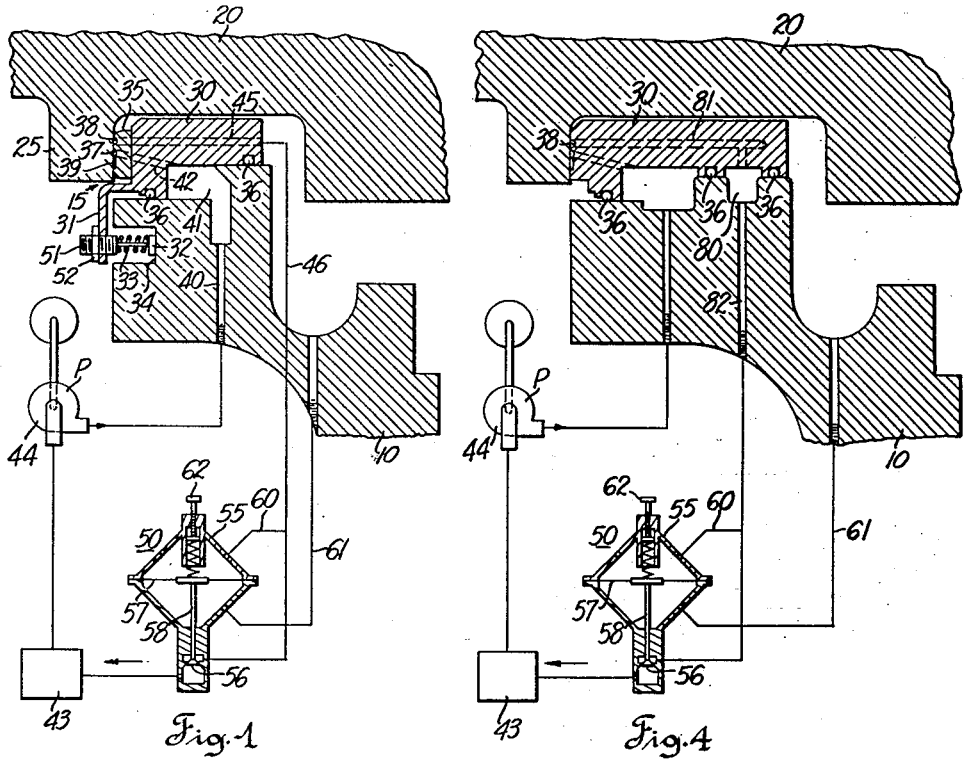
Fig. 1 is a fragmentary sectional view of the seal of the present invention with a schematic showing of the fluid system.
Fig. 4 is an alternate embodiment of the present invention in which an additional O-ring is added to provide a discharge chamber.
Figure 2:
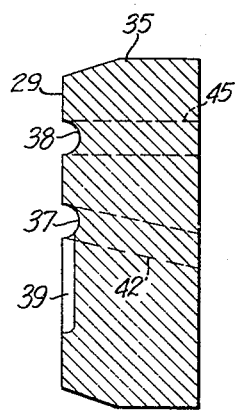
Fig. 2 is an enlarged sectional view of the sealing surface of the seal member shown in Fig. 1.
Figure 3:
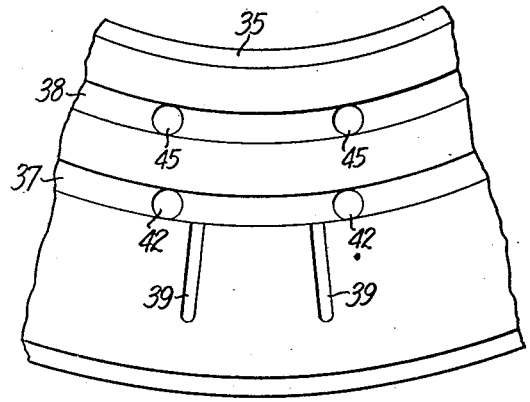
Fig. 3 is an enlarged end view of the sealing surface of the seal member shown in Fig. 1.

Referring to the drawing, Fig. 1 shows a portion of a housing enclosure 10 for a dynamoelectric machine having an opening 15 through which the rotating member 20 extends. Rotating member 20 is suitably supported by bearings (not shown) to permit rotation thereof. A radially extending flange 25 is provided on shaft 20 at a point at which shaft 20 extends through the opening 15 in the housing 10.

A suitable annular seal member 30 is presented by the housing 10. Seal member 30 includes an annular radially extending babbitted surface member 35 and means, such as O-rings 36, which permit axial movement of the seal member 30 and, in addition, seal along the joint between seal member 30 and housing 10.

Means are provided to cause the surface of seal member 30 to bear against the surface of the flange 25. These means are shown as arm 31 extending radially outward and providing a plunger 32 and spring 33 bearing against surface 34 of housing 10. The tension provided by spring 33 may be adjusted by means of threads 51 and lock nut 52. An additional biasing force is exerted against seal member 30 by the gas pressure contained within housing 10.

Surface portion 35 of seal member 30 comprises an annular outer or supply groove 37, an annular inner or discharge groove 38, and a face 29 radially inward of groove 38 formed between groove 38 and the inner periphery of seal member 30. In addition, radially extending wiping grooves 39 are provided in the outer portion of surface portion to distribute the lubricating oil across the outer surface of the seal portion 35.

Suitable means are provided for supplying oil to supply groove 37. A duct 40 extends through housing 10 to an annular supply chamber 41 formed between O-rings 36. A source of oil under pressure, shown generally as reservoir 43 and pump 44, is connected to duct 40 to supply oil to supply chamber 41 through duct 40. Ducts 42 extend from supply chamber 41 to groove 37 to permit oil to flow to the surface of seal member 30. Ducts 42 extend from several points around supply chamber 41 to groove 37. In this manner a good supply of oil is provided to all points of groove 37 and an even pressure around the groove is assured.

Means are provided to carry off oil collected by inner groove 38. These means comprise duct 45 which may be a single duct or a plurality of ducts extending from groove 38 through the seal member 30. A flexible tube shown schematically as line 46 may be connected to duct 45 for returning the oil to the supply reservoir.

Means 50 are provided for controlling the rate at which oil flows from annular groove 38 through discharge ducts 45 and 46 to return to the fluid reservoir. These means comprise a controlled valve in discharge duct 46. The rate at which the oil is permitted to discharge from annular groove 38 is determined by the differential selected by which the oil pressure is greater than the hydrogen pressure. Differential valve 55 includes a valve portion 56 connected to a diaphragm 57 by a stem 58. Valve portion 56 seats against faces in the duct conducting oil through the differential valve 55 to control the flow of oil therethrough.

Oil pressure is supplied to one side of the diaphragm 57 through duct 60 giving a pressure that is responsive to the oil pressure in the inner groove and hydrogen pressure is provided on the other side of diaphragm 57 through duct 61 connected to the hydrogen within the machine. Biasing means 62 are provided to control the differential pressure by which the oil pressure exceeds the hydrogen pressure.

In operation of the hydrogen seal, oil under pressure is supplied through duct 40 to chamber 41 and through duct 42 to annular groove 37. The oil is permitted to flow both inward and outward across the surfaces of seal member 35 to lubricate and cool the surfaces. Oil flowing radially inward is collected in groove 38 and flows through drain lines 45 and 46 to be returned to the reservoir. Relief valve 55 restricts the flow of the discharge oil to provide a back pressure which may be adjustable to any desired differential above the hydrogen pressure in the machine. The back pressure causes an oil flow from the groove slightly inward and provides an oil film between face portion 29 of seal member 30 and annular flange 25 to prevent the confined gas from entering the seal. Because the flow is supervised by the hydrogen pressure, this differential is maintained for all hydrogen pressures. With a one pound differential, for example, between the oil in the inner groove and the hydrogen in the machine, only a minimum amount of oil flows into the machine to contaminate the hydrogen.

In a modification of the present invention shown in Fig. 4 an additional or third O-ring 36 is provided. An annular discharge chamber 80 is formed between this third O-ring and the adjacent O-ring. Annular discharge chamber 80 receives discharge oil from groove 38 through ducts 81 and returns the oil to the reservoir through duct 82 and differential valve 50. By this arrangement it is not necessary to provide a flexible duct connecting the axially movable seal member to the permanent piping externally of the machine. Instead, ducts 82 are provided in housing 10 and permanent threaded piping is then attached to duct 82.

In the embodiment shown in Fig. 4 spring means for applying a biasing force on the seal member 30 is omitted. Instead, the piston force of the oil pressure and the hydrogen pressure against the surfaces of the seal member are relied upon to provide the biasing force.

Although but two embodiments of the present invention have been shown and described, it will be apparent to one skilled in the art that various changes and modifications may be made therein without departing from the spirit of the invention or the scope of the appended claims.

What is claimed is:

1. In a dynamoelectric machine, a housing containing a cooling gas at a pressure above atmospheric, a rotatable shaft, a flange on said shaft having an annular radially extending surface, means providing a seal for said gas between said flange and said housing comprising an annular seal member presented by said housing, said seal member being disposed on the cooling gas side of said flange and having a radially extending surface opposing said surface of said flange, means including said gas pressure causing the surface of said seal member to bear against said surface of said flange, a first annular groove in said surface of said seal members, a second annular groove in said surface of said seal member disposed radially inward and in the same radial plane of said first groove, means supplying oil to said first groove at a pressure above said gas pressure, drain means provided for said second groove to discharge oil flowing radially inward across said surface from said first groove to said second groove, means for controlling the pressure of said oil in said second groove to a predetermined relation to said gas pressure to maintain sufficient oil in said second groove to provide a fluid film at the interface of said seal member and said flange preventing said cooling gas from entering said seal.

2. In a dynamoelectric machine, a housing containing a cooling gas at a pressure above atmospheric, a rotatable shaft, a flange on said shaft having an annular radially extending surface, means providing a seal for said gas between said flange and said housing comprising an annular seal member presented by said housing, said seal member being disposed on the cooling gas side of said flange and having a radially extending surface opposing said surface of said flange, means including said gas pressure causing the surface of said seal member to bear against said surface of said flange, a first annular groove in said surface of said seal members, means supplying oil to said first groove at a pressure above said gas pressure, said oil pressure causing said oil to flow from said first groove radially inward and outward, a second annular groove in said surface of said seal member disposed radially inward and in the same radial plane of said first groove to collect said oil flowing radially inward, drain means provided for said second groove to discharge said collected oil in said second groove, and means for controlling the flow of said oil from said second groove to provide a back pressure of said oil in said second groove at a predetermined differential to said gas pressure causing said oil in said second groove to flow slightly radially inward to form a fluid film between the face portion of the seal and said radial flange radially inward of said second groove to prevent said gas within said housing from entering said seal.

3. In a dynamoelectric machine, a housing containing a cooling gas at a pressure above atmospheric, a rotatable shaft, a flange on said shaft having an annular radially extending surface, means providing a seal for said gas between said flange and said housing comprising an annular seal member presented by said housing, said seal member being disposed on the cooling gas side of said flange and having a radially extending surface opposing said surface of said flange, means including said gas pressure causing the surface of said seal member to bear against said surface of said flange, a first annular groove in said surface of said seal member, means supplying oil to said first groove at a pressure above said gas pressure to cause said oil to flow radially inward and outward between said surfaces, a second annular groove in said surface of said seal member disposed radially inward and in the same radial plane of said first groove to collect said oil flowing radially inward, duct means connecting said second groove to said supply means for returning said oil flowing radially inward from said first groove to said second groove, a valve in said duct means controlled by said gas pressure to regulate the oil pressure in said second groove by restricting the flow therefrom to provide a back pressure of said oil in said second groove at a predetermined differential to said gas pressure causing the oil in said second groove to flow slightly radially inward of said second groove to form a fluid film between the face portion of said seal radially inward of said second groove and said radial flange to prevent said gas within said housing from entering said seal.

4. In a dynamoelectric machine, a housing containing a cooling gas at a pressure above atmospheric, a rotatable shaft, a flange on said shaft having an annular radially extending surface, means providing a seal for said gas between said flange and said housing comprising an axially movable annular seal member being disposed on the cooling gas side of said flange and having a radially extending surface opposing said surface of said flange, means including said gas pressure causing the surface of said seal member to bear against said surface of said flange, a first annular groove in said surface of said seal member, means supplying oil to said first groove at a pressure above said gas pressure to cause said oil to flow across said surfaces, a second annular groove in said surface of said seal member disposed radially inward and in the same radial plane of said first groove to collect said oil flowing radially inward, duct means connecting said second groove to said supply means for returning said oil flowing radially inward from said first to said second groove, a differential pressure valve controlled by said gas pressure and said oil pressure in said second groove to restrict the flow of said oil from said second groove and maintain the pressure of said oil in said second groove to a predetermined relation to said gas pressure causing said oil in said second groove to flow slightly inward to form a fluid film between the face portion of said seal radially inward of said second groove and said radial flange to prevent said gas within said housing from entering said seal.

5. In a dynamoelectric machine, a housing containing a cooling gas at a pressure above atmospheric, a rotatable shaft, a flange on said shaft having an annular radially extending surface, means providing a seal for said gas between said flange and said housing comprising an axially movable seal member being disposed on the cooling gas side of said flange and having a radially extending surface opposing said surface of said flange, means including said gas pressure causing the surface of said seal member to bear against the surface of said flange, a first annular groove in said surface of said seal member, a first, a second, and a third O-ring positioned between said movable seal member and said housing to seal the joint therebetween and to permit axial movement of said seal member, a first annular chamber between said first and said second O-rings, oil supply means, a second annular groove in said surface of said seal member disposed radially inward and in the same radial plane of said first groove to collect said oil flowing radially inward, duct means connecting said oil supply means to said first chamber, duct means connecting said first chamber to said first groove to supply said oil to said first groove, a second annular chamber between said second and said third O-rings, duct means connecting said second annular groove to said second chamber, duct means connecting said second chamber to said reservoir for returning said oil from said second groove, a differential pressure valve controlled by said gas pressure and said oil pressure in said second groove to restrict the flow of oil from said second groove and maintain the pressure of said oil in said second groove in a predetermined relation to said gas pressure causing said oil in said second groove to flow slightly radially inward of said second groove to form a fluid film between the face portion of said seal member radially inward of said second groove and said radial flange to prevent said gas within said housing from entering said seal.

References Cited in the file of this patent

UNITED STATES PATENTS

| | | |
|---|---|---|
| 1,759,074 | Van Rijswijk | May 20, 1930 |
| 1,867,236 | Van Rijswijk | July 12, 1932 |
| 1,876,515 | Emmet | Sept. 6, 1932 |

FOREIGN PATENTS

| | | |
|---|---|---|
| 200,121 | Australia | Nov. 2, 1955 |